United States Patent
Stanfill et al.

(10) Patent No.: US 12,392,421 B2
(45) Date of Patent: Aug. 19, 2025

(54) OVERFILL PREVENTION VALVE

(71) Applicant: Clay and Bailey Manufacturing Company, Kansas City, MO (US)

(72) Inventors: DeWayne Stanfill, Harviell, MO (US); George Andrew Borst, Kansas City, MO (US); Boris Bajic, Overland Park, KS (US); Amanuel T. Berhe, Kansas City, MO (US); Kong M. Her, Olathe, KS (US); Christopher P. Borst, Kansas City, MO (US); Phillip H. Borst, Parkville, MO (US)

(73) Assignee: Clay and Bailey Manufacturing Company, Kansas City, MO (US)

( * ) Notice: Subject to any disclaimer, the term of this patent is extended or adjusted under 35 U.S.C. 154(b) by 295 days.

(21) Appl. No.: 17/870,211

(22) Filed: Jul. 21, 2022

(65) Prior Publication Data

US 2023/0025926 A1    Jan. 26, 2023

Related U.S. Application Data

(60) Provisional application No. 63/224,739, filed on Jul. 22, 2021.

(51) Int. Cl.
| | | |
|---|---|---|
| *F16K 31/22* | (2006.01) | |
| *F16K 33/00* | (2006.01) | |
| *F16K 31/28* | (2006.01) | |

(52) U.S. Cl.
CPC ............. *F16K 31/22* (2013.01); *F16K 33/00* (2013.01); *F16K 31/28* (2013.01); *F16K 2200/50* (2021.08); *Y10T 137/7404* (2015.04)

(58) Field of Classification Search
CPC .......... F16K 31/34; F16K 31/28; F16K 31/24; F16K 31/22; F16K 31/18; F16K 31/20; F16K 31/30; F16K 33/00; F16K 2200/502; F16K 24/04; F16K 24/06; F16K 27/07; Y10T 137/053; Y10T 137/6004; Y10T 137/7358; Y10T 137/7361; Y10T 137/7368; Y10T 137/7371;

(Continued)

(56) References Cited

U.S. PATENT DOCUMENTS

| | | | | |
|---|---|---|---|---|
| 1,007,715 | A * | 11/1911 | Mason | F16K 31/24 137/429 |
| 4,186,765 | A * | 2/1980 | Anderson | F16K 33/00 137/414 |
| 4,313,459 | A * | 2/1982 | Mylander | F17C 13/04 137/433 |
| 5,007,450 | A |  4/1991 | Babb et al. | |
| 5,144,836 | A |  9/1992 | Webb | |
| 5,388,622 | A * | 2/1995 | Phillips | B67D 7/365 141/229 |

(Continued)

*Primary Examiner* — Craig J Price
(74) *Attorney, Agent, or Firm* — Hovey Williams LLP

(57) ABSTRACT

An overfill prevention valve for use with a tank includes a valve element disposed in a fluid fill path and a float assembly including an actuator and a repositionable float. The float is selectively fixed relative to and moveable relative to the actuator to adjust a target fill level. The float is buoyantly supported by the fluid such that the float and the actuator are shiftable in correspondence with an actual fill level. The actuator is coupled with the valve element such that the valve element shifts to a closed position when the actual fill level nears a target fill level. The float includes discrete buoyant components that are shiftable away from each other and from the actuator to facilitate shifting of the float relative to the actuator and that are securable relative to each other and relative to the actuator to facilitate operation of the float assembly.

20 Claims, 11 Drawing Sheets

(58) Field of Classification Search
CPC ......... Y10T 137/7404; Y10T 137/7413; Y10T 137/7423; Y10T 137/7426; Y10T 137/0874; Y10T 137/3099; G05D 9/02; B60K 2015/03289; B60K 2015/0772; B60K 15/03504; B60K 15/035; B60K 15/03519; B60K 15/03289; F16L 47/02; F16L 47/14; F02M 37/017; F02M 37/0076
USPC ....... 137/412, 413, 426, 409, 410, 429, 430, 137/15.26, 315.08, 165–168, 195, 38, 39, 137/43, 587, 588; 222/68, 203, 204; 141/98, 59, 198, 202, 229; 236/63; 220/86.2, 745, 746; 123/516, 518, 198 D, 123/520
See application file for complete search history.

(56) References Cited

U.S. PATENT DOCUMENTS

| | | | | |
|---|---|---|---|---|
| 5,655,565 A * | 8/1997 | Phillips | ............. | F16K 21/18 137/448 |
| 5,832,953 A * | 11/1998 | Lattner | ............. | F16K 31/34 137/433 |
| 6,230,730 B1 * | 5/2001 | Garretson | ............. | F16K 31/34 137/430 |
| 7,584,766 B2 * | 9/2009 | David | ............. | F16K 33/00 137/433 |
| 10,139,841 B2 * | 11/2018 | David | ............. | F16K 31/34 |
| 10,822,920 B2 * | 11/2020 | Killie | ............. | F16K 31/22 |
| 2010/0175760 A1 * | 7/2010 | Stuart | ............. | F16K 24/044 137/202 |

* cited by examiner ent application claims priority from U.S. Provi-
OVERFILL PREVENTION VALVE

CROSS-REFERENCE TO RELATED APPLICATION

1. Priority Application

The present application claims priority from U.S. Provisional Patent Application No. 63/224,739, filed Jul. 22, 2021, and entitled OVERFILL PREVENTION VALVE, the entire disclosure of which is hereby incorporated by reference herein.

BACKGROUND OF THE INVENTION

1. Field of the Invention

The present invention relates generally to a valve for use with a tank for containing a fluid. More particularly, the present invention concerns an overfill prevention valve configured to restrict filling of the tank past a predetermined maximum or target fill level.

2. Discussion of the Prior Art

Those of ordinary skill in the art will appreciate that a variety of conventional means of preventing overfill of a tank or other container are commonly used. For instance, overfill prevention valves are commonly placed near a tank inlet so as to be positioned in a primary filling flow path. When a target fill level is reached within the tank, the valve at least substantially prevents further fluid flow through the inlet and into the tank.

SUMMARY

According to one aspect of the present invention, an overfill prevention valve is provided. The overfill prevention valve is configured for use with a tank defining an interior chamber. The chamber is configured to contain a fluid defining an actual fill level. The valve comprises an inlet element, a valve element, and a float assembly. The inlet element at least in part defines a fluid fill path. The valve element is shiftable between open and closed valve element positions, wherein the valve element at least substantially prevents flow along the fluid fill path when in the closed valve element position. The float assembly includes an actuator and a repositionable float configured to be selectively fixed relative to and moveable relative to the actuator to adjust a target fill level. The float is configured to be buoyantly supported by the fluid such that the float and the actuator are shiftable in correspondence with the actual fill level. The actuator is operably coupled with the valve element such that the valve element shifts to the closed valve element position when the actual fill level nears the target fill level and the actuator has shifted to a valve shut-off position. The float includes a plurality of discrete buoyant components. The buoyant components are shiftable away from each other and away from the actuator to facilitate shifting of the float relative to the actuator. The buoyant components are securable relative to each other and relative to the actuator to facilitate operation of the float assembly.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

Figure 9:
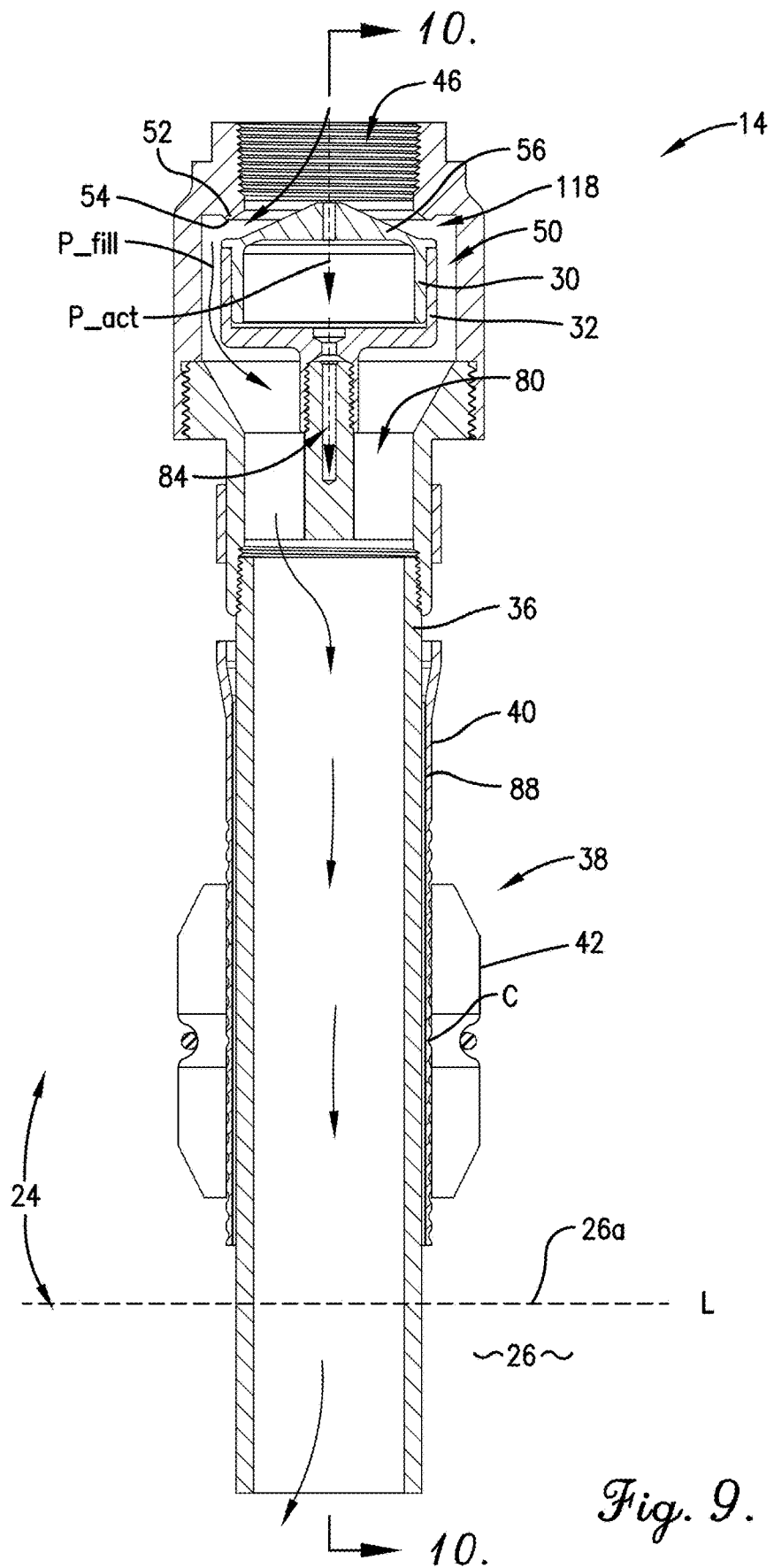
FIG. 9 is an elevational cross-sectional view of the valve of FIGS. 1-3, with the float secured to the actuator in a first float calibration position, the fluid at a low fill level spaced downwardly from the float, and the valve element in an open valve element position.
Figure 10:
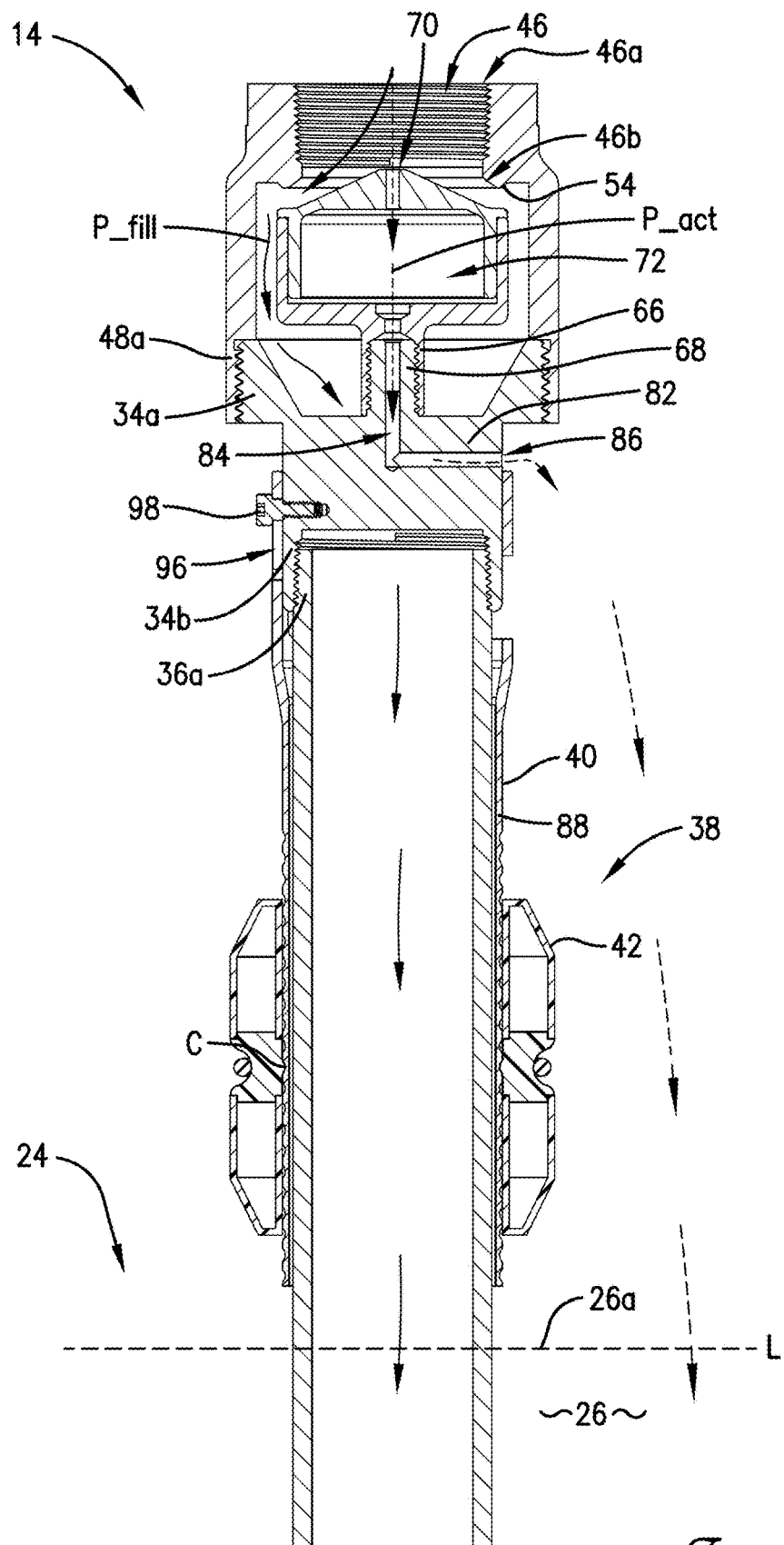
FIG. 10 is an alternative elevational cross-sectional view of the valve as configured in FIG. 9, taken along line 10-10 of FIG. 9.
Figure 11:
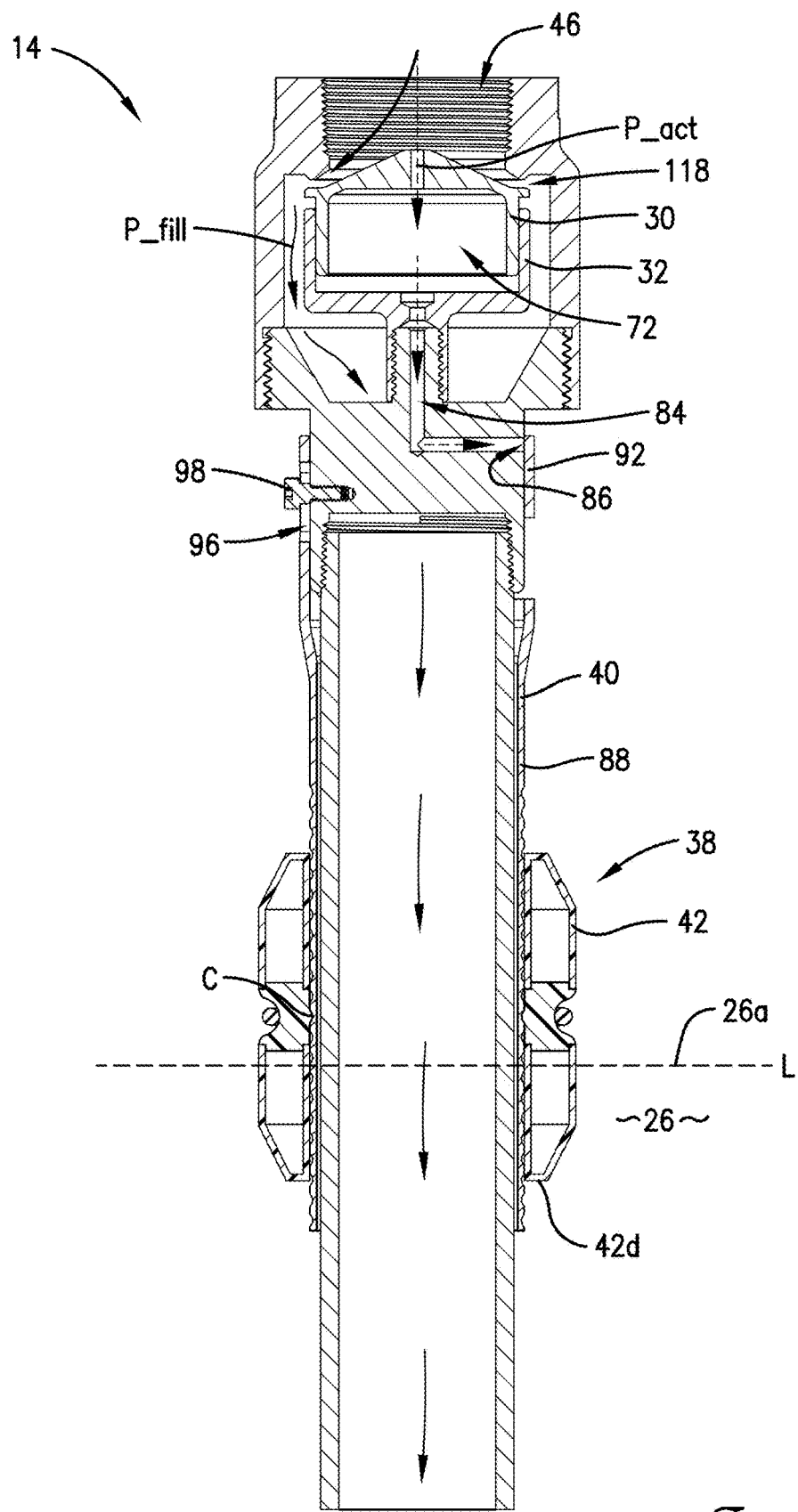
FIG. 11 is an elevational cross-sectional view of the valve similar to that of FIG. 10, but with the fluid at a level just past a trigger fill level, the float assembly shifted upwardly such that the actuator obstructs a pilot channel outlet, and the valve element shifted to an intermediate valve element position.
Figure 12:
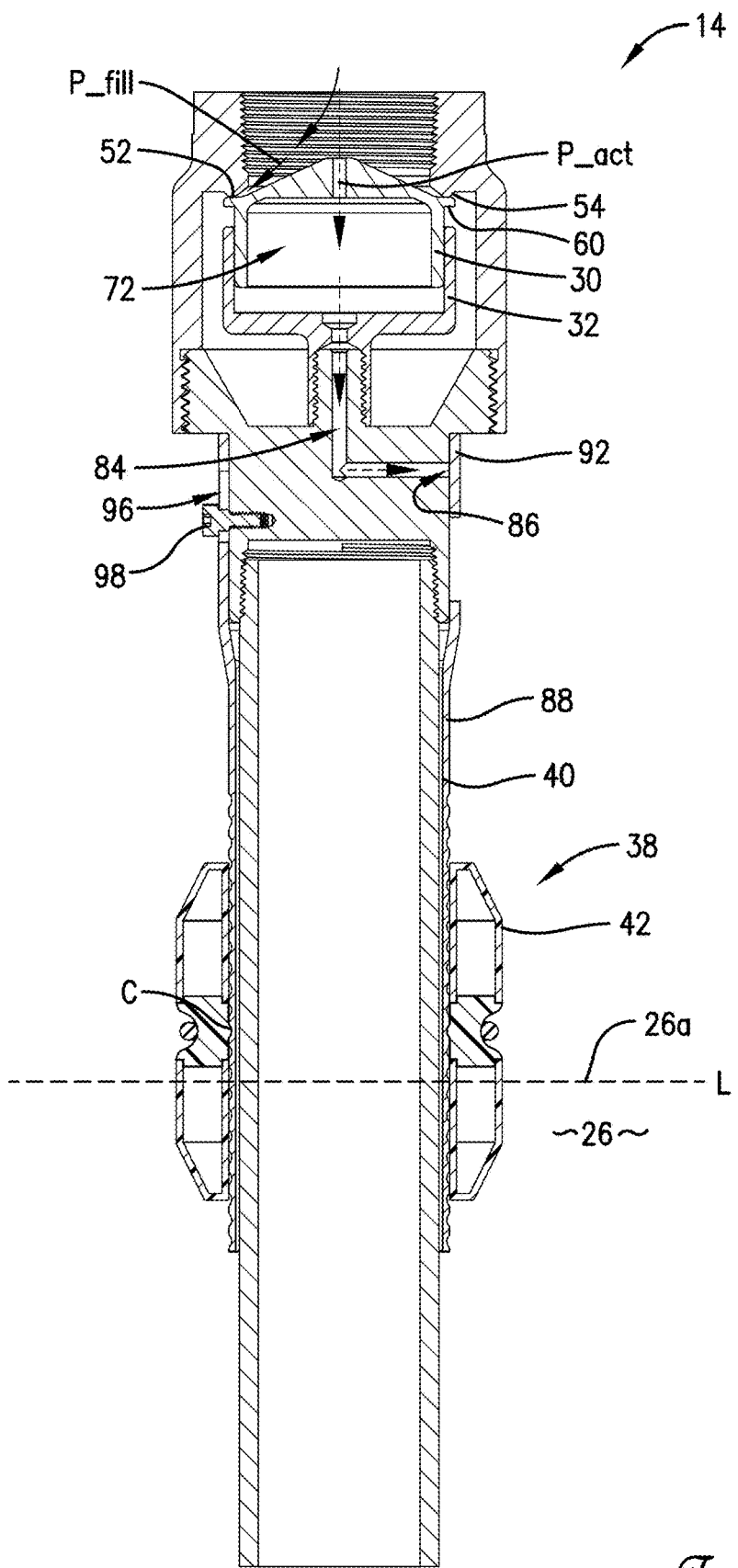
Figure 13:
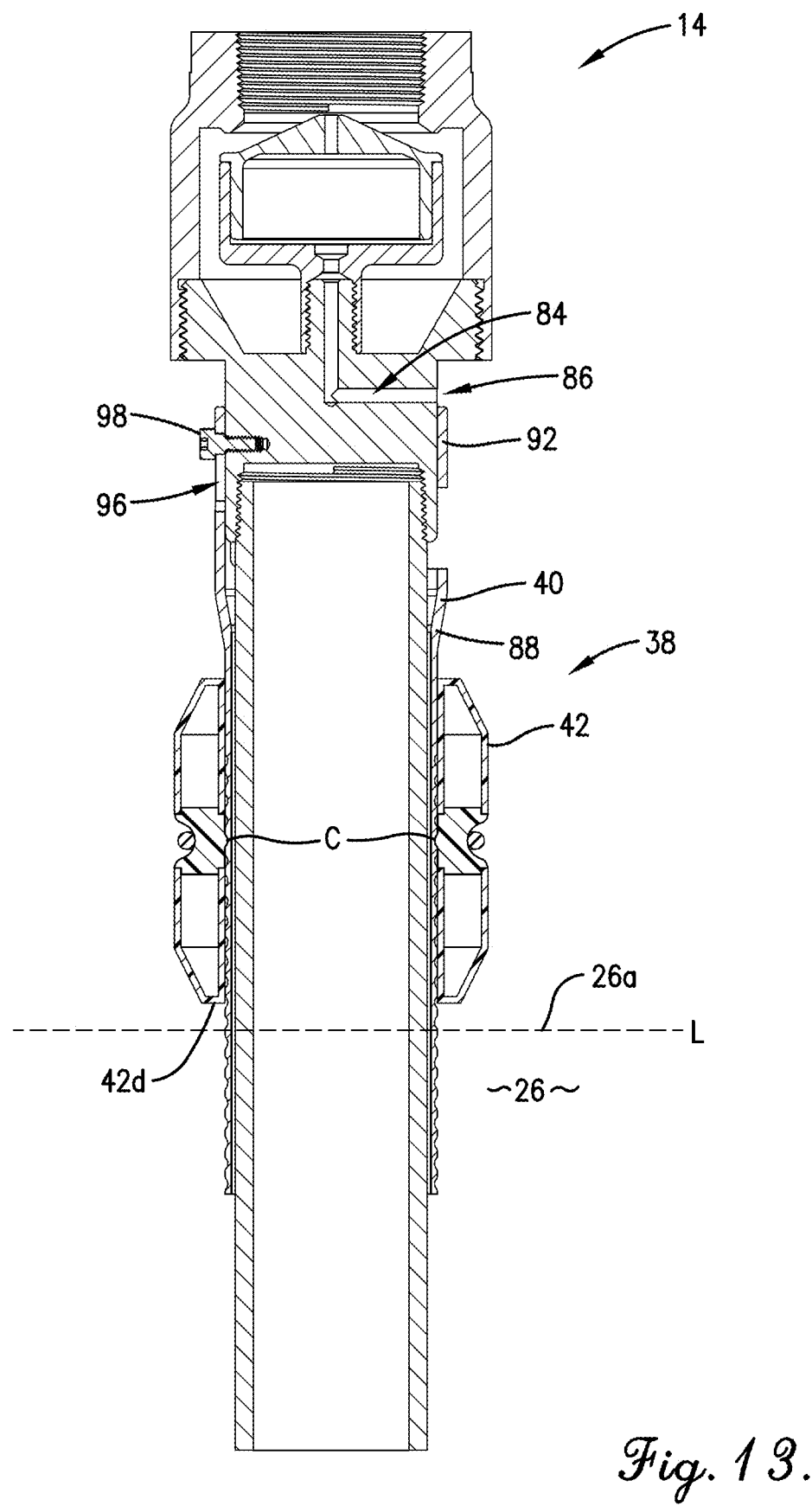

FIG. 12 is an elevational cross-sectional view of the valve similar to that of FIGS. 10 and 11, but with the fluid at a maximum or target fill level, the float assembly shifted even further upwardly relative to FIG. 11 such that the actuator is at an uppermost actuator position and continues to obstruct the pilot channel outlet, and the valve element shifted to a closed valve element position; and FIG. 13 is an elevational cross-sectional view of the valve similar to that of FIG. 10, but with the float secured to the actuator in a second float calibration position and the fluid having reached a fill level similar to that of FIG. 11 yet still not reaching the float, with the second float calibration position thus corresponding to greater trigger and target fill levels than those associated with the first float calibration position of FIGS. 9-12.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Tank System Overview

Figure 1:
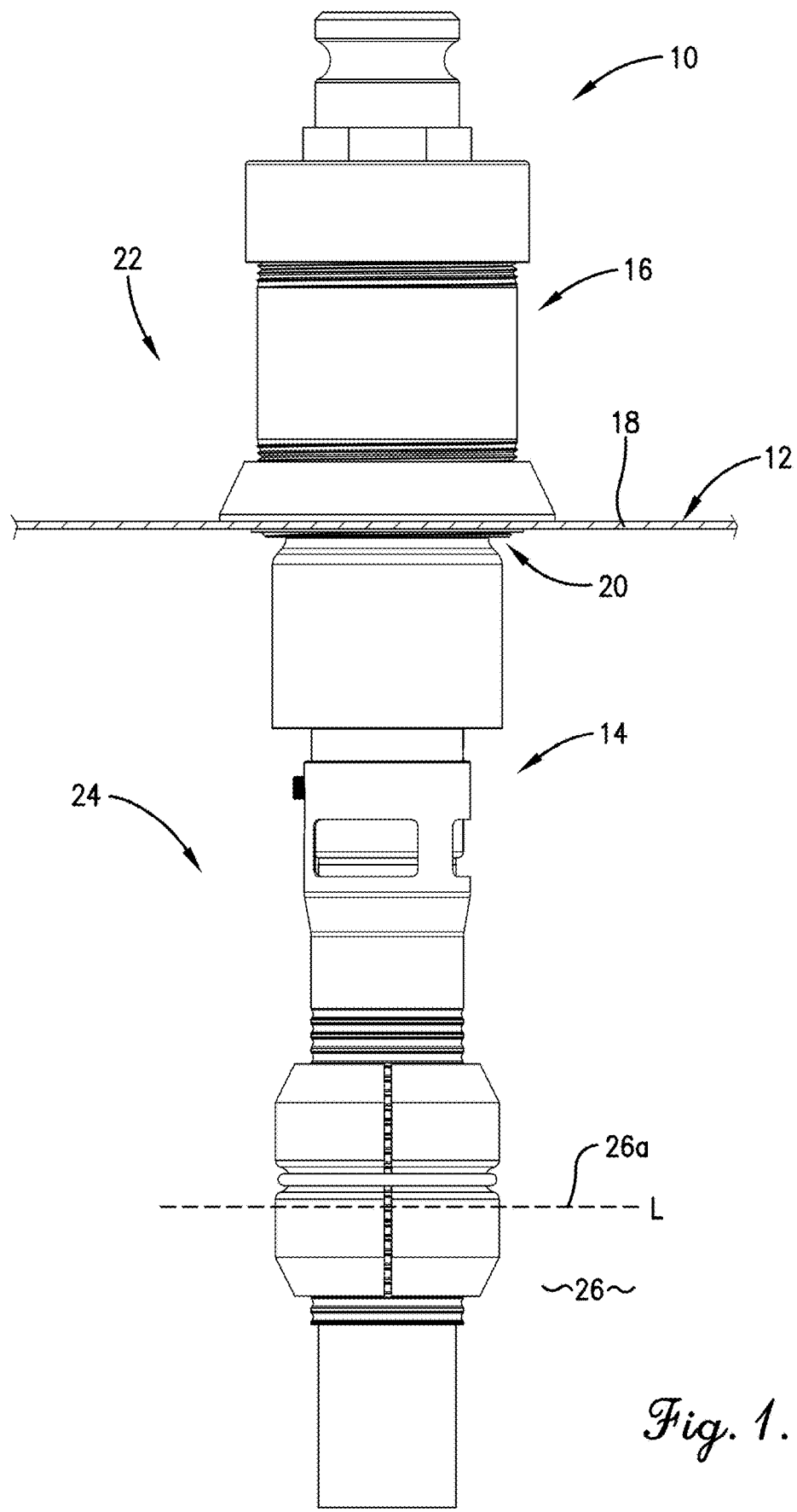
FIG. 1 is a partially cross-sectioned environmental view of a tank fitted with an overflow prevention valve in accordance with a first preferred embodiment of the present invention.
Figure 2:
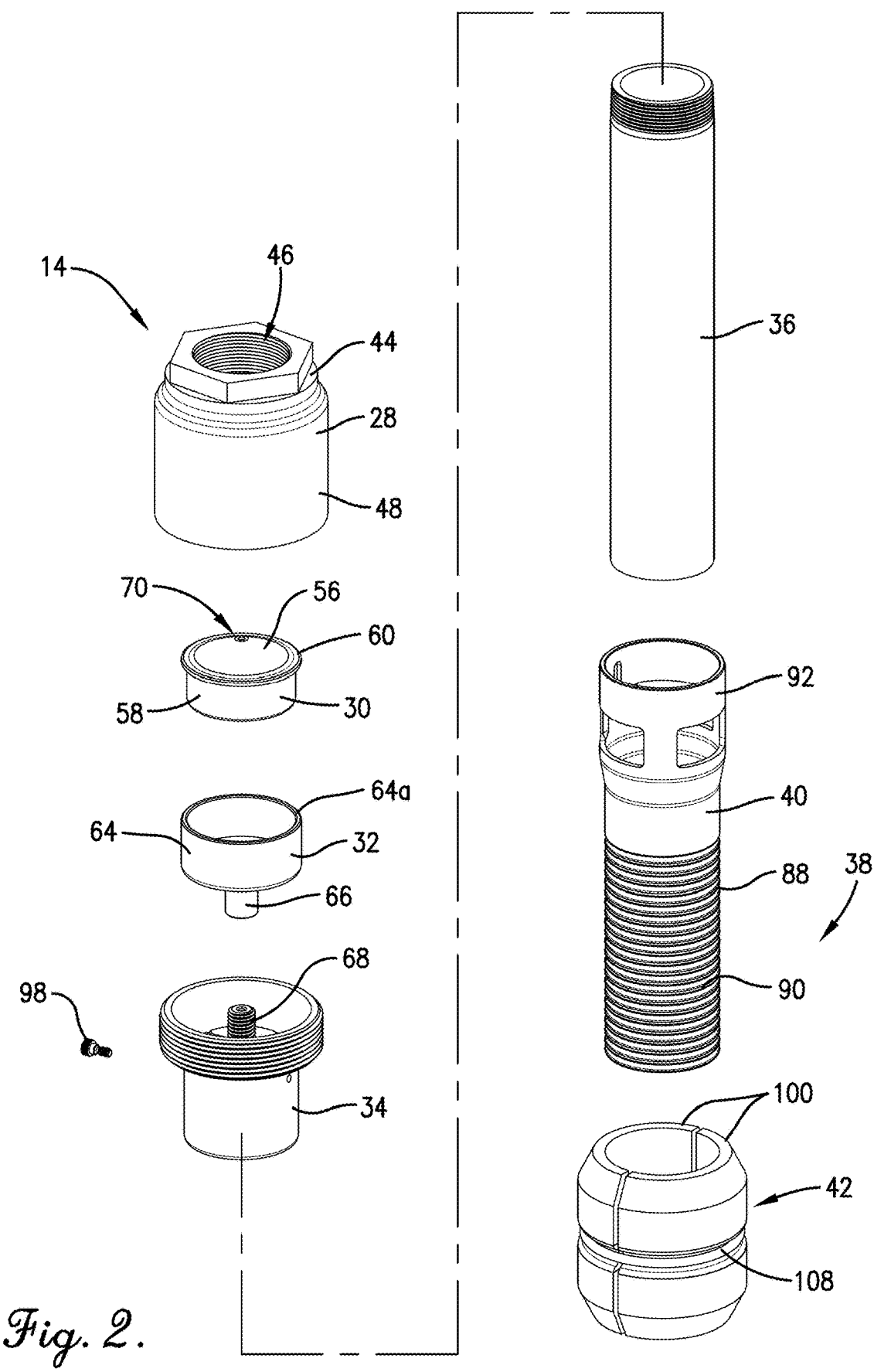
FIG. 2 is an exploded top, front perspective view of the valve of FIG. 1.
Figure 3:
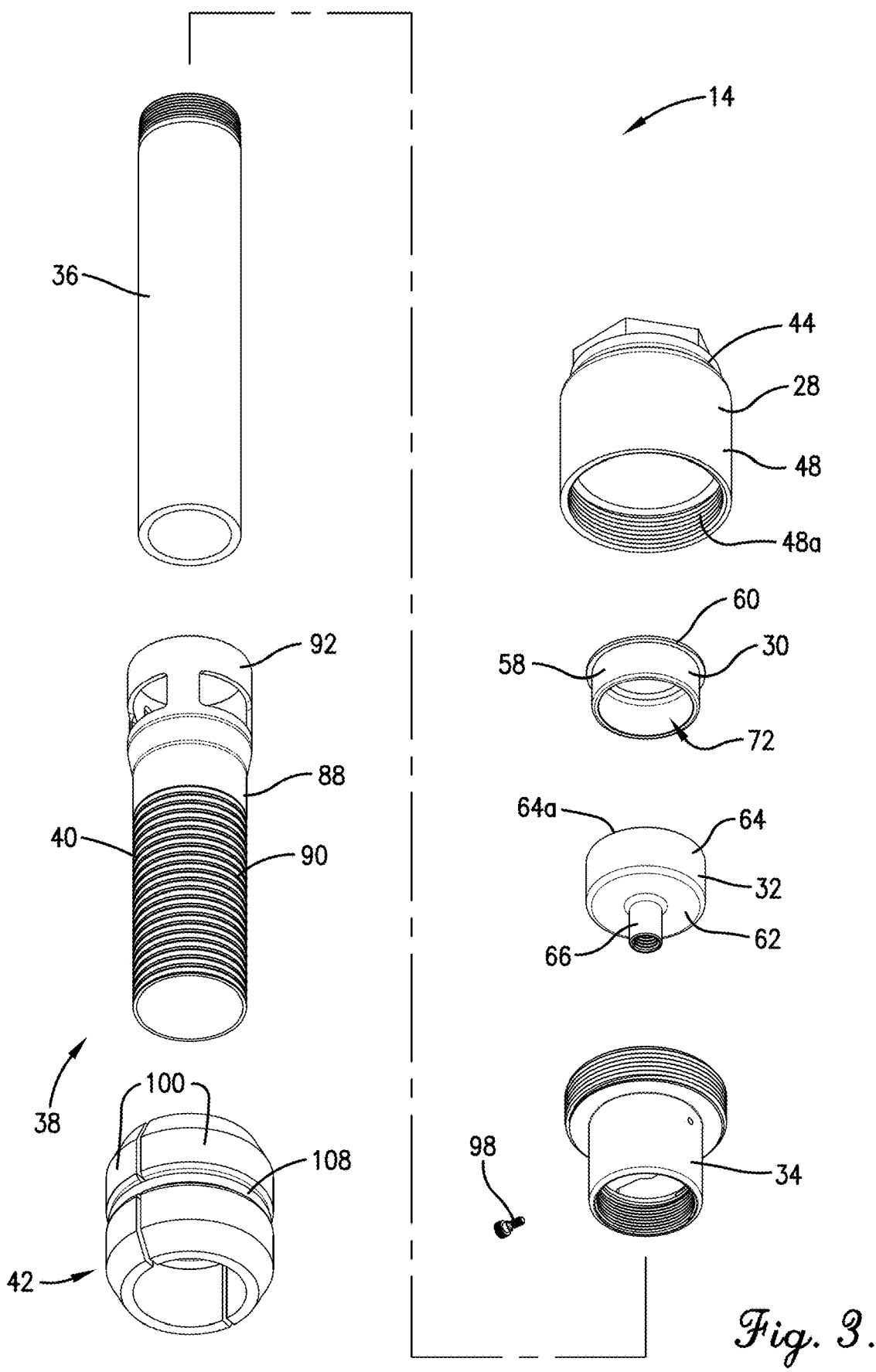
FIG. 3 is an exploded bottom, rear perspective view of the valve of FIGS. 1 and 2.
Figure 4:
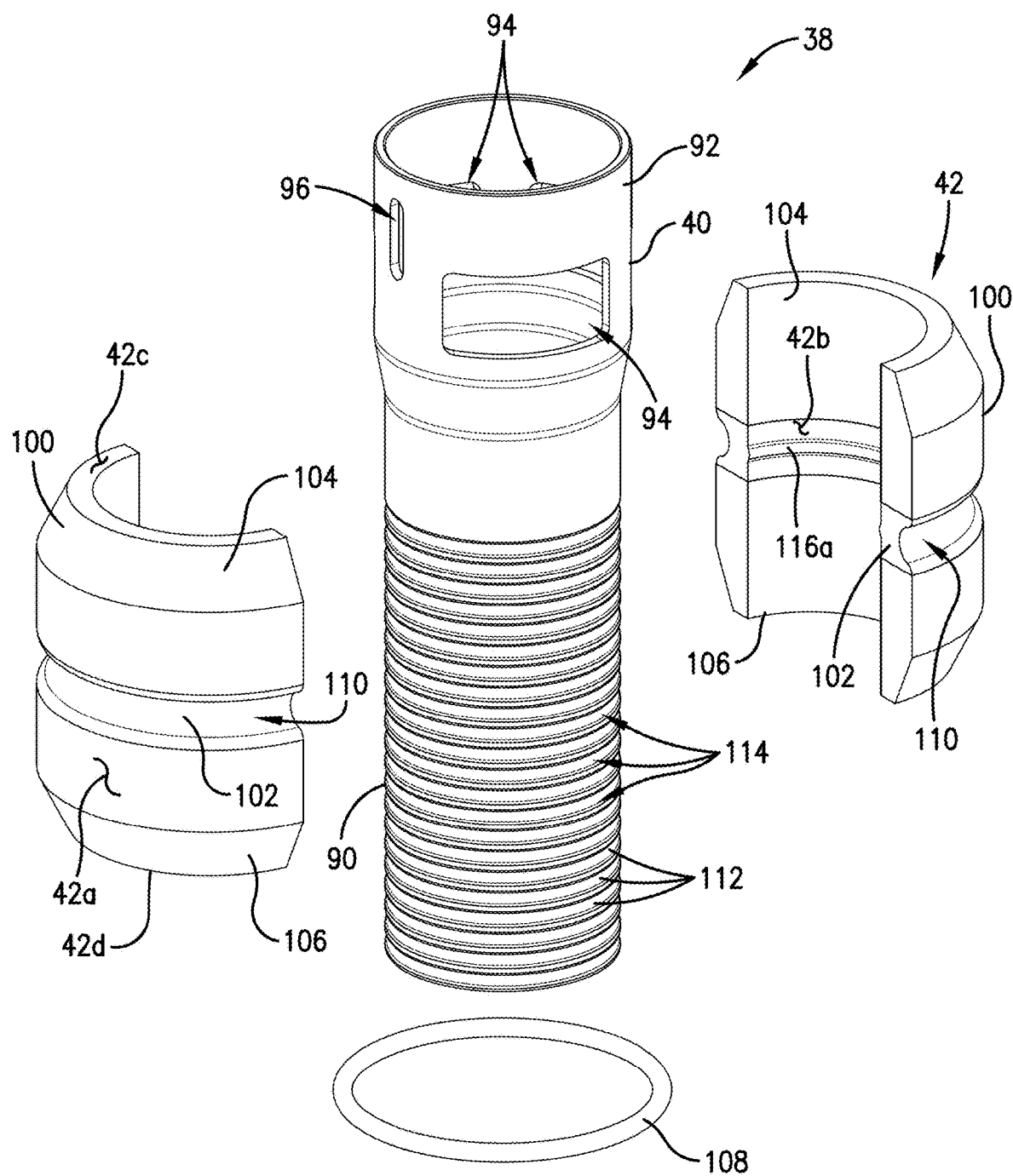
FIG. 4 is an enlarged, exploded top perspective view of the float assembly of the valve of FIGS. 1-3.

With initial respect to FIG. 1, a tank system 10 is illustrated. The tank system 10 includes a tank 12, a valve 14, and a coupling assembly 16. The tank 12 includes a wall 18 defining an opening (not shown) therethrough. In the illustrated embodiment, the coupling assembly 16 and the valve 14 are secured to one another at a junction 20 disposed in or adjacent the opening, such that the coupling assembly 16 is generally disposed in an exterior environment 22 outside the tank 12 and the valve 14 is disposed in an interior chamber 24 defined by and within the tank 12.

Is is noted that, although the exterior environment 22 may be associated with the above-ground outdoors, such environment is not limited in that manner. For instance, the tank might be disposed within a building, underwater, underground, etc.

Fluid 26 may be inserted into the interior chamber 24 via the coupling assembly 16 and the valve 14, as will be discussed in greater detail below. It is noted that the fluid 26 is preferably a liquid, although it is permissible according to some aspects of the present invention for the fluid to be in part gaseous (including but not limited to foam or foamy liquids).

The tank 12 may be any of a variety of shapes and sizes and may be configured for storage and/or transport of any of a variety of fluids. In a preferred embodiment, for instance, the tank 12 is an above-ground diesel storage tank 12 for containing diesel fuel 26.

In a broad sense, the valve 14 may be understood to be downstream of and at least in part in fluid communication with the coupling assembly 16, such that the valve 14 and the coupling assembly 16 cooperatively at least in part define a fluid fill path P_fill.

The fluid 26 in the tank chamber 24 preferably presents a top surface 26a that defines an actual (i.e., current or instantaneous) fill level L. The position of the actual fill level L will vary as the tank 12 is filled, with the actual fill level L shifting upward as more fluid 26 is added to the interior chamber 24 through the coupling assembly 16 and thereafter the valve 14.

As will be readily understood by those of ordinary skill in the art, other elements that could hypothetically be associated with the tank system, such as drains, additional inlets, or secondary chambers, could affect the fill level and variations thereof, as well. Although such elements may be included without departing from the scope of at least some aspects of the present invention, for purposes of simplicity and clarity, the invention is described herein in the context of the simple single-inlet, single chamber, and non-draining/enclosed (at least during the filling process) tank system 10.

As illustrated, the top surface 26a is preferably at least substantially flat, although imperfections may occur therealong due to vibration of the tank, turbulence associated with the filling process, rising of bubbles, and so on.

Valve Structure Overview

The valve 14 broadly includes an inlet element 28, a valve element 30, a valve element housing 32, a valve body 34, a discharge pipe 36, and a float assembly 38. The float assembly 38 includes an actuator 40 and a repositionable float 42.

The inlet element 28 is preferably in the form of a valve cap 28. The valve cap 28 preferably includes a constricted region or neck 44 that defines an inlet 46 adjacent the coupling assembly 16.

The valve cap 28 further preferably includes a perimetrically extending sidewall 48 at least in part defining a selectively flow-through valve element chamber 50 in which the valve element 30 and the valve element housing 32 are at least substantially disposed. The sidewall 48 is preferably expanded relative to the neck 44, with the valve element chamber 50 likewise expanded relative to the inlet 46.

The sidewall 48 of the valve cap 28 preferably includes a threaded connection region 48a for engagement with a corresponding connection region 34a presented by the valve body 34. Any of a variety of connection means fall within the scope of the present invention, however, although it is most preferred that such connection means are at least substantially fluid tight.

The inlet 46 includes upper and lower ends 46a and 46b, respectively. The valve cap 28 preferably includes an arcuately extending projection 52 defining a valve seat 54 at the lower end 46b. The valve seat 54 is preferably annular and most preferably circular, although other shapes fall within the scope of the present invention.

As will be discussed in greater detail below, the valve element 30 is shiftable between an open valve element position, as shown in FIGS. 9, 10, and 13, and a closed valve element position, as shown in FIG. 12. A preferably continuous (as opposed to discrete) plurality of intermediate valve element positions, one of which is illustrated in FIG. 11, are disposed therebetween.

The valve element 30 is preferably at least substantially received in the valve element housing 32, with the extent of such receipt varying with the position of the valve element 30. As will be readily apparent from further discussion below, the valve element 30 is preferably slidably shiftable relative to the valve element housing 32.

In the illustrated embodiment, the valve element 30 is in the form of a piston 30, with the valve element housing 32 comprising a piston sleeve structure 32. More particularly, the valve element 30 preferably includes a generally conical (as illustrated), frusto-conical, or domed top 56, a hollow skirt 58 extending axially downwardly from the top 56, and a flange 60 extending radially outwardly from the top 56 and the skirt 58 at a juncture therebetween.

The valve element housing 32, in contrast, includes a radially extending base 62, a piston sleeve 64 extending axially upwardly from the base 62, and a connecting post 66 extending axially downwardly from the base 62, opposite the piston sleeve 64.

The piston sleeve 64 is preferably sized and shaped so as to at least substantially circumscribe and overlie the skirt 58 when the valve element 30 is in the open position. The piston sleeve 64 preferably also at least substantially circumscribes and overlies the skirt 58, albeit with such overlayment being to a lesser axial extent, when valve element 30 is in the closed position or any of the intermediate positions.

When the valve element 30 is in the open position, the flange 60 preferably rests on an upper edge 64a of the piston sleeve 64. The flange 60 is preferably spaced axially upward of the edge 64a when the valve element 30 is in intermediate or closed positions, however.

Furthermore, the flange 60 preferably engages the valve seat 54 when the valve element 30 is in the closed position (see FIG. 12). The valve element 30 thus at least substantially (and preferably entirely) prevents flow along the fluid fill path P_fill when in the closed valve element position.

Entirely different valve element and housing designs may also be utilized without departing from the ambit of some aspects of the present invention. Among other things, for instance, alternative top shapes, including but not limited to flat shapes, fall within the scope of some aspects of the present invention.

The connecting post 66 is preferably configured to receive therein a corresponding peg 68 formed by the valve body 34. Most preferably, such connection is by means of corresponding threads, although other connection types fall within the scope of the present invention. Similarly to the connection regions 28a and 34a of the valve cap 28 and the valve body 34 respectively, however, such connection types are preferably at least substantially fluid tight.

The valve element 30 preferably defines an orifice 70 in fluid communication with the inlet 46. Most preferably, the orifice 70 extends axially through the top 56 into an actuating chamber 72 cooperatively defined by the valve element or piston 30 and the valve element housing or piston sleeve structure 32. The function of the actuating chamber 72 will be discussed in detail below.

As will also be discussed in greater detail below, a drain 74 is preferably formed in the base 62 of the valve element housing or piston sleeve structure 32. The drain 74 is preferably in fluid communication with the actuating chamber 72.

Figure 7:
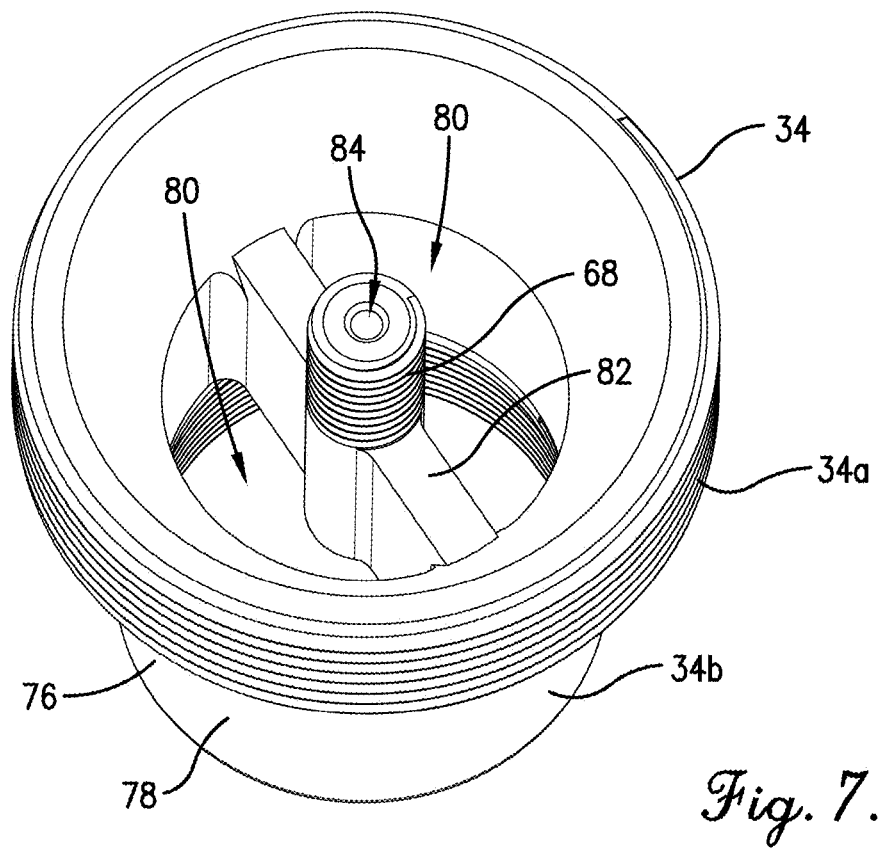
FIG. 7 is an enlarged, top perspective view of the valve body of the valve of FIGS. 1-3.
Figure 8:
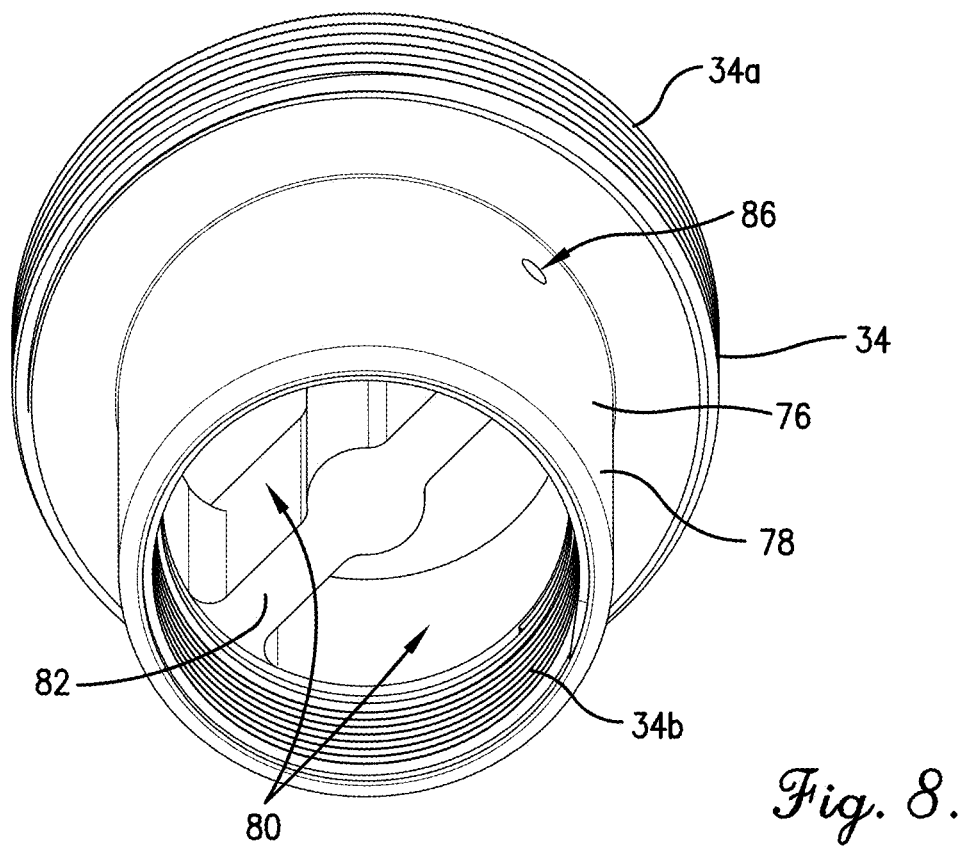
FIG. 8 is a bottom perspective view of the valve body of FIG. 7.

The valve body 34, as noted previously, is preferably at least substantially disposed downstream of and secured to each of the valve cap 28 and the valve element housing 32 via the connection region 34a and the peg 68, respectively. The valve body 34 preferably also includes a lower portion 76. As best shown in FIGS. 7 and 8, the lower portion 76 includes a tube 78 defining a flow-through valve body opening 80 and a strut 82 extending through and bisecting the opening 80. Alternatively stated, the strut 82 preferably extends diametrically across the tube 78, connecting diametrically opposed sides thereof. Although it is necessary that some form of flow-through opening be defined by the lower portion 76, it is permissible for such opening to be alternatively configured. Among other things, for instance, more than one strut might obstruct the opening.

The lower portion 76 and, more particularly, the strut 82 preferably defines therethrough a pilot channel 84 in fluid communication with the drain 74, the actuating chamber 72, the orifice 70, and the inlet 46 so as to cooperatively therewith at least in part define an actuating fluid path P_act.

In a preferred embodiment, as illustrated, the pilot channel 84 presents an outlet opening 86 at a downstream end of the actuating fluid path P_act. As will be discussed in greater detail below, the outlet opening 86 preferably opens into the interior chamber 24 of the tank 12 during normal filling operations.

It is particularly noted that, whereas the actuating fluid path P_act and the fluid fill path P_fill both are preferably in part defined by the inlet 46, the paths P_fill and P_act preferably thereafter diverge.

As noted previously, the valve 14 also preferably includes a discharge pipe 36. The discharge pipe 36 preferably extends axially downwardly from the valve body 34 and is secured thereto by interengaging threads defined by respective overlapping portions 36a and 34b. As discussed above with regard to other interconnections, alternative connection means fall within the scope of the present invention but are most preferably at least substantially fluid tight.

Although the illustrated discharge pipe 36 extends exclusively axially downwardly, it is permissible according to some aspects of the present invention for the pipe to include one or more bends, curves, and/or branches.

The actuator 40 of the float assembly 38 preferably comprises an axially extending actuator sleeve 88 including a float-engaging portion 90 and an upper portion 92 disposed axially upward of the float-engaging portion 90. The float-engaging portion 90 is preferably constricted relative to the upper portion 92, although alternative relative sizing, including at least substantially equal sizing, falls within the scope of the present invention. The preferred sizing is such that the upper portion 92 at least substantially circumscribes and overlies (preferably in a slip or loose fit) the lower portion 76 of the valve body 34. The float-engaging portion 90 preferably at least substantially circumscribes and overlies (also preferably in a slip or loose fit) the discharge pipe 36. Thus, as will be discussed in greater detail below, movement of the actuator 40 is preferably generally radially restricted relative to the valve body 34 and the discharge pipe 36 due to complementary diametrical sizing.

The upper portion 92 preferably defines a plurality of arcuately extending, arcuately spaced apart windows 94. The upper portion 92 also preferably defines an axially extending slot 96. A fastener 98 (e.g, a set screw, as in the illustrated embodiment) extends through the slot 96 and into the lower portion 76 of the valve body 34 to slidably secure the actuator 40 relative to the valve body 34. That is, the fastener 98 is preferably set in a radial position at which it does not substantially squeeze the actuator 40, thereby facilitating axial shifting of the actuator 40 relative to the valve body 34 and the discharge tube 78. The extent of such relative shifting corresponds to an axial height of the slot 96, as defined between upper and lower margins thereof.

In addition to specifically defining the range of axial motion of the actuator 40, the slot 96 and fastener 98 also prevent the actuator 40 from falling off of the valve body 34 and the discharge tube 78 in a general sense.

Although the illustrated configuration is most preferred, it is permissible according to some aspects of the present invention for the actuator to be secured to the discharge tube rather than to the valve body. Furthermore, although it is most preferred that a discrete fastener 98 be provided, similar or at least substantially equivalent functionality might be achieved via the provision of one or more of any sort of stop or projection, including both discretely and integrally formed structures. It is also noted that such structures or fasteners might extend instead into a slot formed in the valve body or discharge tube, instead of the in actuator. Further still, multiple slots and fasteners may be provided without departing from the scope of some aspects of the present invention.

The float 42 preferably includes a plurality of buoyant components 100. In the illustrated embodiment, two (2)

buoyant components 100 are provided, although more may be provided within the ambit of some aspects of the present invention.

Preferably, the buoyant components 100 are identical to one another, although variations fall within the scope of some aspects of the present invention.

Each buoyant component 100 preferably includes a solid central portion 102 and upper and lower hollow shell portions 104 and 106, respectively, axially above and below the central portion 102. The shell portions 104 and 106 are preferably air-filled, although other gases or even liquid might permissibly be used, provided suitable buoyancy is maintained. It is also permissible for each buoyant component to be solidly constructed (e.g., of a buoyant material such as foam), for more or fewer hollow shell portions to be provided, and for any hollow portion(s) to be alternatively arranged.

As will be discussed in greater detail below, the buoyant components 100 are preferably securable relative to each other and relative to the actuator 40 to facilitate operation of the float assembly 38. More particularly, as noted previously, the actuator 40 includes an axially extending actuator sleeve 88. The buoyant components 100 cooperatively at least in part circumscribe the actuator sleeve 88 when secured relative to the actuator 40 but are radially shiftable away from each other and from the actuator sleeve 88 (and, more broadly, from the actuator 40) to facilitate selective moveability of the float 42 relative to the actuator 40.

Figure 5:
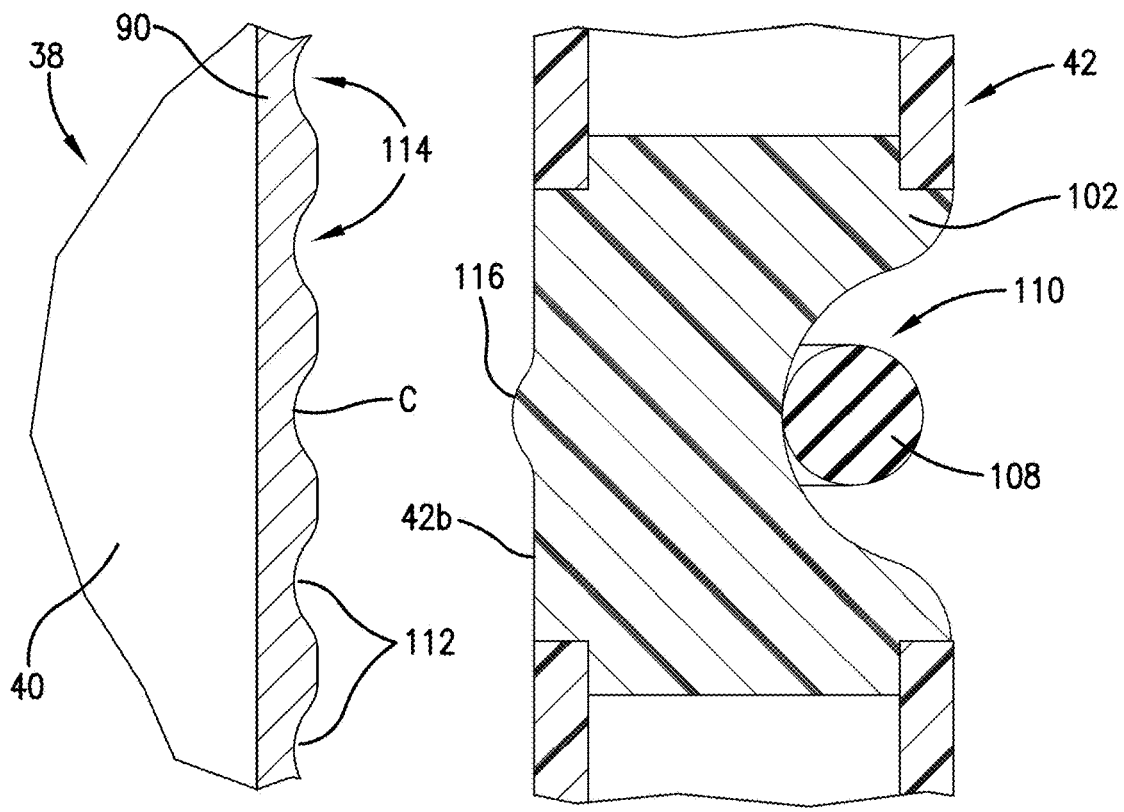
FIG. 5 is an enlarged, cross-sectional view of a portion of the float assembly of FIG. 4, with the float thereof being shifted away from the actuator.
Figure 6:
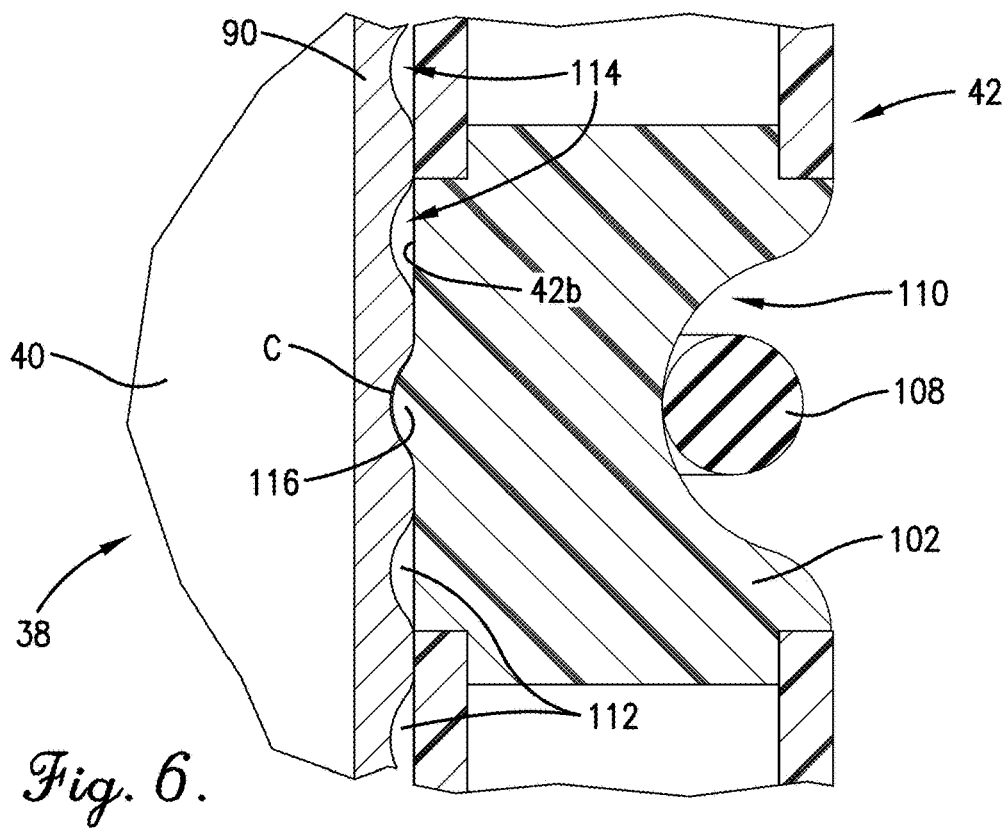
FIG. 6 is a view of the portion of the float assembly shown in FIG. 5, but with the float being secured relative to the actuator.

The float assembly 38 further preferably includes a retaining element 108 shiftable between a buoyant component retaining position (See FIG. 6 and others), in which the retaining element 108 secures the buoyant components 100 relative to each other and to the actuator 40, and a buoyant component shifting position (see FIG. 5), in which the retaining element 108 permits shifting of the buoyant components 100 away from each other and away from the actuator 40.

The retaining element 108 is preferably resiliently deformable and, in the illustrated embodiment, comprises a stretchable band 108 (e.g., a gasket or an O-ring) encircling the buoyant components 100. Other types of retaining elements, including but not limited to cinches, latches, hooks, fasteners, ties, and combinations thereof, fall within the scope of some aspects of the present invention, however.

In a preferred embodiment, each of the buoyant components 100 and, most preferably, the solid central portions 102 thereof, define a respective externally disposed band-receiving hollow 110. The band-receiving hollows 110 preferably cooperatively receive the retaining element or band 108. Other means of receiving the retaining element, including means associated with alternative retaining element designs, fall within the scope of some aspects of the present invention, however.

The float 42 (or, more specifically, the buoyant components 100 cooperatively) presents a radially outer surface 42*a*, a radially inner surface 42*b* that at least substantially circumscribes the actuator 40, an upper surface 42*c*, and a lower surface 42*d*.

Selectable Fixation of Float Relative to Actuator

As will be discussed in greater detail below, the float 42 is preferably selectively fixed relative to and moveable relative to the actuator 40 to adjust a target fill level (i.e., a desired maximum fill level) for fluid 26 in the interior chamber 24 of the tank 12. That is, the float 42 is configured to be buoyantly supported by the fluid 26 such that the float 42 and the actuator 40 are shiftable in correspondence with an actual or instantaneous fill level L of fluid 16 in the tank 12. The actuator 40 is operably coupled with the valve element 30 such that the valve element 30 shifts to the closed valve element position and obstructs the fluid fill path P_fill when the actual fill level L reaches a trigger level near the target fill level and the actuator 40, as driven by the buoyancy of the float 42, shifts to a valve shut-off position.

More particularly, in preferred embodiment, a plurality of float calibration positions 112 are defined axially along the actuator 40. The float 42 is configured to be selectively fixed relative to the actuator 40 at a selected one C of the float calibration positions 112, wherein the selected one C of the float calibration positions 112 corresponds to the target fill level.

Most preferably, the float calibration positions 112 are discrete (i.e., rather than continuously or smoothly defined). In the illustrated embodiment, for instance, the float-engaging portion 90 of the actuator 40 includes or defines a plurality of arcuately extending grooves 114 each defining one of the float calibration positions 112.

The grooves 114 preferably extend continuously around the entirety of the float-engaging portion 90 so as to continuously circumscribe it. More particularly, the grooves 114 are preferably circular grooves. However, intermittent, discontinuous, and/or only partial perimetrical extension is permissible according to some aspects of the present invention. It is also permissible for the grooves to be in the form of one or more non-extending indentations.

The float 42 preferably includes a rib 116 projecting radially inwardly from the inner surface 42*b* thereof. Most preferably, each of the buoyant components 100 defines a radially inwardly projecting rib portion 116*a*, with the rib portions 116*a* cooperatively forming the rib 116.

The rib 116 preferably extends continuously along the entirety of the inner surface 42*b* of the float 42, except at junctures between the buoyant components 100. That is, each rib portion 116 preferably extends continuously along the entirety of the inner surface 42*b* of the float 42 so as to be generally circular in form. However, intermittent, discontinuous, and/or only partial perimetrical extension of either or both of the rib portions is permissible according to some aspects of the present invention. It is also permissible for the rib to be in the form of one or more non-extending projections.

In a broad sense, it is simply preferred that the float and the actuator present complementary elements configured to engage one another to fix the float relative to the actuator. In the illustrated embodiment, such complementary elements are the aforementioned rib 116 and grooves 114, with the rib 116 being configured to be received in a selected one of the grooves 114 to fix the float 42 relative to the actuator 40 at the selected float calibration position C. However, other complementary configurations, including but not limited to configurations additionally or alternatively using cinches, latches, hooks, fasteners, ties, and combinations thereof, fall within the scope of some aspects of the present invention.

It is particularly noted that a reversal of the preferred presentation of the rib 116 by the float 42 and grooves 114 by the actuator 40 is permissible according to some aspects of the present invention. For instance, the actuator could instead include one or more ribs, with the float instead defining one or more grooves. Furthermore, a plurality of ribs might be instead provided for complementary engagement with a single groove, or plurality of both ribs and grooves might be provided by respective structures. Still further, ribs and grooves might both be provided by both the float and the actuator.

Of course, similar variations utilizing alternative complementary elements also fall within the scope of some aspects of the present invention.

Filling and Shut-Off Process

An exemplary tank filling and shut-off process is illustrated in FIGS. 9-12. With initial reference to FIG. 9, fluid 26 initially enters the valve 14 via the inlet 46. The majority of the fluid 26, referred to herein as a primary portion thereof, then flows along the primary fluid fill path P_fill, whereas a smaller actuating portion (or pilot portion) of the fluid 26 flows along the actuating fluid path P_act.

More particularly, after the fluid 26 flows through the inlet 46, the primary portion thereof next flows past the valve element 30 in its open position and through the valve element chamber 50. More particularly, the primary portion flows over and down the surface of the conical valve element top 56, through a gap 118 disposed between the valve element flange 60 and the valve seat 54 defined by the valve cap 28, and alongside the valve element housing 32. The primary portion of the fluid 26 thereafter flows through the flow-through valve body opening 80 defined on opposite sides of the strut 82, then downward through the discharge pipe 36 and into the interior chamber 24 of the tank 12.

As shown in FIG. 9, and as discussed previously, the fluid 26 contained in the tank 12 presents an upper surface 26a defining an actual or instantaneous fill level L. As will be understood by those of ordinary skill in the art, such actual fill level L will vary as fluid 26 is added to the tank 12 or removed therefrom. Variations in the level L may also occur due to evaporation or disturbances (see more detailed discussion above).

FIG. 10 illustrates the valve 14 in the same state as in FIG. 9 (i.e., with the fluid 26 at the same actual fill level L and all valve components in the same position). However, in contrast to that of FIG. 9, which clearly illustrates the primary fluid fill path P_fill, the sectioning of FIG. 10 clearly illustrates the secondary or actuating fluid path P_act.

More particularly, as shown in FIG. 10, the actuating portion of the fluid 26 initially enters the valve 14 via the inlet 46 but thereafter flows into the actuating chamber 72 via the orifice 70 defined by the valve element top 56. The actuating portion exits the actuating chamber 72 via the drain 74, and thereafter travels through the pilot channel 84 and out the outlet opening 86, from which it falls through the interior chamber 24 of the tank 12 to join the contained fluid 26 accumulating therein.

In FIG. 11, continued filling of the tank 12 has increased the amount of contained fluid 26 therein, resulting in a substantial rise in the actual fill level L. In fact, the actual fill level L has reached and passed the lower surface 42d of the float 42 and risen to such a level that the float assembly 38 has become buoyantly supported by the fluid 26. The float assembly 38 is thus axially shiftable in correspondence to further variations in the actual fill level L.

The level at which the float assembly 38 becomes axially shiftable in correspondence with the actual fill level L is referred to herein as the trigger fill level, with the actual fill level L in FIG. 11 having exceeded the trigger fill level by a small distance that corresponds to the axial distance by which the actuator sleeve 88 has shifted from FIG. 10 to FIG. 11.

Importantly, the small amount of shifting of the float assembly 38 that has occurred between the states shown in FIGS. 10 and 11 is such that the upper portion 92 of the actuator sleeve 88 has obstructed the outlet opening 86 of the pilot channel 84. The actuating portion of fluid 26 attempting to flow along the actuating fluid path P_act is unable to exit via the outlet opening 86 and instead becomes "backed up." More particularly, as more fluid 26 enters the inlet 46 and, in turn, the actuating fluid path P_act, the actuating fluid first fills the pilot channel 84 and thereafter the actuating chamber 72.

When the actuating chamber 72 in its initial form (i.e., that shown in FIGS. 9 and 10) is full, the actuating fluid 26 therein applies pressure (i.e., "back pressure") to the valve element 30 and the valve element housing 32 that define the actuating chamber 72. This pressure results in axially upward shifting of the valve element or piston 30. This shifting may alternatively be understood to be an expansion of the actuating chamber 72.

The piston 30 continues to shift gradually upward as additional fluid 26 enters the still-expanding actuating chamber 72, with an intermediate position of the piston 30 being illustrated in FIG. 11.

It is noted that, during the gradual upward shifting of the valve element 30, the primary fluid fill path P_fill becomes increasingly obstructed but is not yet fully restricted. That is, the primary portion of the fluid 26 continues to flow along the primary fluid fill path P_fill, with the actual fluid level L thus continuing to increase and the float assembly 38, including both the float 42 and the actuator 40, continuing to shift upward accordingly.

It is also noted that, due to the decreasing size of the gap 118 as the valve element 30 shifts upward, a pressure drop will occur for fluid 26 flowing therethrough. This pressure drop will assist or accelerate the upward shifting of the valve element 30 by increasing the pressure variation between the gap 118 and the actuating chamber 72.

In FIG. 12, the valve element 30 has reached the closed valve element position, in which the flange 60 has engaged the valve seat 54 to cut off further flow along the primary fluid fill path P_fill. The actuator sleeve 88 has also reached its uppermost position, in which it continues to obstruct the pilot channel outlet opening 86.

The actual fill level L has reached its maximum level or, alternatively stated, the desired or target fill level. As will be readily apparent to those of ordinary skill in the art, the target fill level is inherently higher than the trigger fill level. Most preferably, however, the target and trigger fill levels are relatively similar to minimize or reduce the magnitude of shifting required by the float assembly 38.

As will also be readily apparent to those of ordinary skill in the art, the initial position of the float 42 along the actuator 40—i.e., the selected float calibration position C—determines the position of the trigger fill level and, in turn, sets the target fill level.

For instance, if the selected float calibration position were lower than that shown in FIG. 12 (i.e., if the float were initially secured to the actuator sleeve at a lower relative position therealong), the surface of the contained fluid would more quickly rise to a level to support floatation of the float assembly. Thus, the trigger fill level, at which the float assembly begins buoyantly shifting on the top surface of the contained fluid, would be lower than that for the float calibration position C of FIG. 12. The maximum or target fill level would likewise be lower.

In contrast, as shown in FIG. 13, positioning of the float assembly at a higher selected float calibration position C than that of FIGS. 9-12 delays triggering of the actuator 40 and facilitates the insertion of a greater volume of fluid 26 into the tank 12 before the valve element 30 shifts to the closed valve element position and shuts off further flow into the tank interior chamber 24.

In FIG. 13, for instance, the float 42 is disposed higher up along the actuator sleeve 88 than it is in FIGS. 9-12. The current actual fill level L illustrated in FIG. 13, however, is equal to that of FIG. 11. Whereas that same fill level in FIG. 11 is greater than the trigger fill level, and whereas the actuator sleeve 88 has blocked the pilot channel outlet opening 86 as a result, such actual fill level L in FIG. 13 has not even reached the lower surface 42d of the float 42.

Thus, as will be readily apparent to those of ordinary skill in the art, the target fill level of the tank 12 may be easily adjusted simply through shifting of the float 42 relative to the actuator 40. Furthermore, due to the design of the float 42, such shifting may be readily accomplished without the use of tools or complicated procedures.

This enables a single valve design to be readily adapted to a variety of tank sizes and shapes, with the valve 14 (and, particularly, the associated target fill level or "shut-off") being easily calibrated based on the specific parameters of a given tank.

Shifts of the float 42 relative to the actuator 40 may also be understood to result in at least substantially proportional and, more particularly, at least substantially equal shifts in the trigger fill level and the target fill level. For instance, moving the float 42 to new float calibration position C two (2) inches higher than its initial float calibration position C results in the trigger fill level and the maximum or target fill level likewise shifting upward by approximately two (2) inches.

It is noted that provision of discrete float calibration positions 112 facilitates simple and accurate setting of trigger and target fill levels. Most preferably, each calibration position 112 is spaced from the adjacent positions 112 by a constant increment, as well.

Still further, the float assembly is advantageously simple in its design, being devoid of small, easily dropped or lost elements (e.g., set screws, pins, etc.) requirement adjustment as part of calibration processes.

The illustrated float assembly 38 is also readily usable with or easily adaptable for use with any of a variety of valve types, including but not limited to back-pressure operated valves (such as that illustrated herein) and pressure-drop actuated valves.

In some embodiments, for instance, the actuating sleeve might be directly interconnected to the valve element such that shifting of the float and actuating sleeve in conjunction with a rising actual fill level directly results in proportional upward shifting of the valve element. As the valve element approaches the valve seat, the pressure drop or low-pressure zone associated with increased flow velocity through the narrowing gap therebetween assists in the upward shifting of the valve element and subsequent securement of the valve element against the seat. (In such an embodiment, the pilot channel might of course be omitted.) Despite the substantial differences in valve operation, however, no modifications would be required to the float design, including the buoyant components and the retaining element thereof.

Conclusion

Features of one or more embodiments described above may be used in various combinations with each other and/or may be used independently of one another. For instance, although a single disclosed embodiment may include a preferred combination of features, it is within the scope of certain aspects of the present invention for the embodiment to include only one (1) or less than all of the disclosed features, unless the specification expressly states otherwise or as might be understood by one of ordinary skill in the art. Therefore, embodiments of the present invention are not necessarily limited to the combination(s) of features described above.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The inventors hereby state their intent to rely on the Doctrine of Equivalents to determine and access the reasonably fair scope of the present invention as pertains to any apparatus not materially departing from but outside the literal scope of the invention.

What is claimed is:

1. An overfill prevention valve configured for use with a tank defining an interior chamber, said chamber configured to contain a fluid defining an actual fill level, said valve comprising:
    an inlet element at least in part defining a fluid fill path;
    a valve element shiftable between open and closed valve element positions, wherein the valve element at least substantially prevents flow along the fluid fill path when in the closed valve element position; and
    a float assembly including an actuator and a repositionable float configured to be selectively fixed relative to and moveable relative to the actuator to adjust a target fill level,
    said float configured to be buoyantly supported by the fluid such that the float and the actuator are shiftable in correspondence with the actual fill level,
    said actuator being operably coupled with the valve element such that the valve element shifts to the closed valve element position when the actual fill level nears the target fill level and the actuator has shifted to a valve shut-off position,
    said float including a plurality of discrete buoyant components,
    said buoyant components being shiftable away from each other and away from the actuator to facilitate shifting of the float relative to the actuator,
    said buoyant components being securable relative to each other and relative to the actuator to facilitate operation of the float assembly,
    said actuator extending along an axis,
    said buoyant components being radially shiftable away from each other and from the actuator.

2. The valve of claim 1,
    said buoyant components being identical to one another.

3. The valve of claim 1,
    said float assembly further including a retaining element,
    said retaining element being shiftable between a buoyant component retaining position and a buoyant component shifting position, said retaining element securing the buoyant components relative to each other and to the actuator when in the buoyant component retaining position, said retaining element permitting shifting of the buoyant components away from each other and away from the actuator when in the buoyant component shifting position.

4. The valve of claim 3,
said retaining element being resiliently deformable.

5. The valve of claim 3,
said retaining element comprising a stretchable band encircling the buoyant components.

6. The valve of claim 5,
each of said buoyant components defining a band-receiving hollow,
said band-receiving hollows configured to cooperatively receive the stretchable band.

7. The valve of claim 1,
said actuator including an axially extending sleeve,
said buoyant components cooperatively at least in part circumscribing said axially extending sleeve.

8. The valve of claim 1,
a plurality of discrete float calibration positions being defined along the actuator,
said float configured to be selectively fixed relative to the actuator at a selected one of the float calibration positions, wherein the selected one of the float calibration positions corresponds to the target fill level.

9. The valve of claim 8,
one of said actuator and said float including a first complementary element,
the other of said actuator and said float including a plurality of second complementary elements,
each of said second complementary elements at least in part defining a discrete float calibration position,
said float configured to be selectively fixed relative to the actuator at a selected one of the float calibration positions, wherein the selected one of the float calibration positions corresponds to the target fill level.

10. The valve of claim 9,
said first complementary element comprising a projection,
each of said second complementary elements comprising an indentation configured to at least in part receive the projection.

11. The valve of claim 1,
said valve element defining an actuating chamber configured to be filled with an actuating portion of the fluid upon shifting of the actuator to the valve shut-off position,
said valve element configured to shift to the closed valve element position as result of pressure exerted thereon by the actuating portion of the fluid in the actuating chamber,
said valve element defining an orifice extending between and fluidly interconnecting the inlet and the actuating chamber,
said overfill prevention valve defining a pilot channel in fluid communication with the actuating chamber, such that the inlet, the orifice, the actuating chamber, and the pilot channel cooperatively at least in part define an actuating fluid path,
said actuator configured to obstruct flow of fluid through the actuating fluid path when the actuator is in the valve shut-off position, such that the actuating chamber fills with the actuating portion of the fluid.

12. An overfill prevention valve configured for use with a tank defining an interior chamber, said chamber configured to contain a fluid defining an actual fill level, said valve comprising:
an inlet element at least in part defining a fluid fill path;
a valve element shiftable between open and closed valve element positions, wherein the valve element at least substantially prevents flow along the fluid fill path when in the closed valve element position; and
a float assembly including an actuator and a repositionable float configured to be selectively fixed relative to and moveable relative to the actuator to adjust a target fill level,
said float configured to be buoyantly supported by the fluid such that the float and the actuator are shiftable in correspondence with the actual fill level,
said actuator being operably coupled with the valve element such that the valve element shifts to the closed valve element position when the actual fill level nears the target fill level and the actuator has shifted to a valve shut-off position,
said float including a plurality of discrete buoyant components,
said buoyant components being shiftable away from each other and away from the actuator to facilitate shifting of the float relative to the actuator,
said buoyant components being securable relative to each other and relative to the actuator to facilitate operation of the float assembly,
one of said actuator and said float including a first complementary element,
the other of said actuator and said float including a second complementary element,
said complementary elements configured to engage one another to fix the float relative to the actuator,
said float including said first complementary element,
said actuator including a plurality of said second complementary elements,
each of said second complementary elements at least in part defining a discrete float calibration position,
said float configured to be selectively fixed relative to the actuator at a selected one of the float calibration positions, wherein the selected one of the float calibration positions corresponds to the target fill level,
said float presenting a radially inner surface at least in part circumscribing said actuator,
said first complementary element comprising an arcuately extending float rib projecting radially inwardly from said inner surface,
each of said second complementary elements comprising a respective arcuately extending actuator groove defined by the actuator,
said float rib being received in a selected one of said actuator grooves when the float is fixed relative to the actuator.

13. The valve of claim 12,
said float rib including a plurality of arcuately extending float rib segments,
each of said buoyant components including one of said float rib segments.

14. The valve of claim 12,
said buoyant components being identical to one another.

15. The valve of claim 12,
said float assembly further including a retaining element,
said retaining element being shiftable between a buoyant component retaining position and a buoyant component shifting position, said retaining element securing the buoyant components relative to each other and to the actuator when in the buoyant component retaining position, said retaining element permitting shifting of the buoyant components away from each other and away from the actuator when in the buoyant component shifting position.

16. The valve of claim 15,
said retaining element being resiliently deformable.

17. The valve of claim 15,
said retaining element comprising a stretchable band encircling the buoyant components.

18. The valve of claim 17,
each of said buoyant components defining a band-receiving hollow,
said band-receiving hollows configured to cooperatively receive the stretchable band.

19. The valve of claim 12,
said actuator including an axially extending sleeve,
said buoyant components cooperatively at least in part circumscribing said axially extending sleeve.

20. The valve of claim 12,
said valve element defining an actuating chamber configured to be filled with an actuating portion of the fluid upon shifting of the actuator to the valve shut-off position,
said valve element configured to shift to the closed valve element position as result of pressure exerted thereon by the actuating portion of the fluid in the actuating chamber,
said valve element defining an orifice extending between and fluidly interconnecting the inlet and the actuating chamber,
said overfill prevention valve defining a pilot channel in fluid communication with the actuating chamber, such that the inlet, the orifice, the actuating chamber, and the pilot channel cooperatively at least in part define an actuating fluid path,
said actuator configured to obstruct flow of fluid through the actuating fluid path when the actuator is in the valve shut-off position, such that the actuating chamber fills with the actuating portion of the fluid.

* * * * *